(12) United States Patent
Rausch et al.

(10) Patent No.: US 8,027,646 B1
(45) Date of Patent: Sep. 27, 2011

(54) COMMUNICATION SYSTEM AND METHOD FOR FILTERING AND ATTENUATING A SIGNAL BETWEEN AN ANTENNA SYSTEM AND A BASE STATION

(75) Inventors: Walter F. Rausch, Shawnee, KS (US); Harry W. Perlow, Tarpon Springs, FL (US); Habib Riazi, Stafford, VA (US)

(73) Assignee: Clear Wireless LLC, Kirkland, WA (US)

( * ) Notice: Subject to any disclaimer, the term of this patent is extended or adjusted under 35 U.S.C. 154(b) by 444 days.

(21) Appl. No.: 12/251,657

(22) Filed: Oct. 15, 2008

(51) Int. Cl.
*H04B 1/46* (2006.01)
*H04B 1/00* (2006.01)
*H04B 15/00* (2006.01)

(52) U.S. Cl. .......................................... 455/80; 455/63.4

(58) Field of Classification Search .................. 455/80, 455/81, 82, 83, 117, 272, 25, 63.4, 561, 562.1, 455/575.7
See application file for complete search history.

(56) References Cited

U.S. PATENT DOCUMENTS

| 6,313,713 | B1 | 11/2001 | Ho et al. |
| 6,956,896 | B2 | 10/2005 | Johnson |

*Primary Examiner* — Eugene Yun
(74) *Attorney, Agent, or Firm* — O'Brien Jones, PLLC

(57) ABSTRACT

A communication system is supplied for filtering and attenuating a receive signal in between a bi-directional antenna system and a bi-directional base station system. In the communication system, a first circulator is configured to receive a receive signal from a first bi-directional link coupled to the bi-directional antenna system and circulate the receive signal to a first uni-directional link. A signal processing system is configured to receive the receive signal from the first uni-directional link, filter and attenuate the receive signal, and transfer the receive signal to a second uni-directional link. A second circulator is configured to receive the receive signal from the second uni-directional link, circulate the receive signal to a second bi-directional link coupled to the bi-directional base station system, receive a transmit signal from the second bi-directional link, and circulate the transmit signal to a third uni-directional link. Additionally, the first circulator is configured to receive the transmit signal from the third uni-directional link and circulate the transmit signal to the first bi-directional link coupled to the bi-directional antenna system.

20 Claims, 7 Drawing Sheets

COMMUNICATION SYSTEM AND METHOD FOR FILTERING AND ATTENUATING A SIGNAL BETWEEN AN ANTENNA SYSTEM AND A BASE STATION

TECHNICAL BACKGROUND

A base station is connected to an antenna by a feedline. The feedline is bidirectional and can be comprised of a variety of different signal processing components. In operation, a base station's antenna receives and transmits wireless communication signals over the air. A communication signal is received by the antenna and the signal is transferred to the base station by way of the feedline. The antenna also receives interference/noise from various sources such as other base stations and other antennas as well as various other sources. During installation a test signal is inserted into the feedline to determine the loss of the feedline.

OVERVIEW

Generally described, a communication system is supplied for filtering and attenuating a receive signal in between a bi-directional antenna system and a bi-directional base station system. In an example, a first circulator is configured to receive a receive signal from a first bi-directional link coupled to the bi-directional antenna system and circulate the receive signal to a first uni-directional link. A signal processing system is configured to receive the receive signal from the first uni-directional link, filter and attenuate the receive signal, and transfer the receive signal to a second uni-directional link. A second circulator is configured to receive the receive signal from the second uni-directional link, circulate the receive signal to a second bi-directional link coupled to the bi-directional base station system, receive a transmit signal from the second bi-directional link, and circulate the transmit signal to a third uni-directional link. Additionally, the first circulator is configured to receive the transmit signal from the third uni-directional link and circulate the transmit signal to the first bi-directional link coupled to the bi-directional antenna system. A method of operating a communication system to filter and attenuate a receive signal in between a bi-directional antenna system and a bi-directional base station system is also provided.

DETAILED DESCRIPTION

Figure 1:
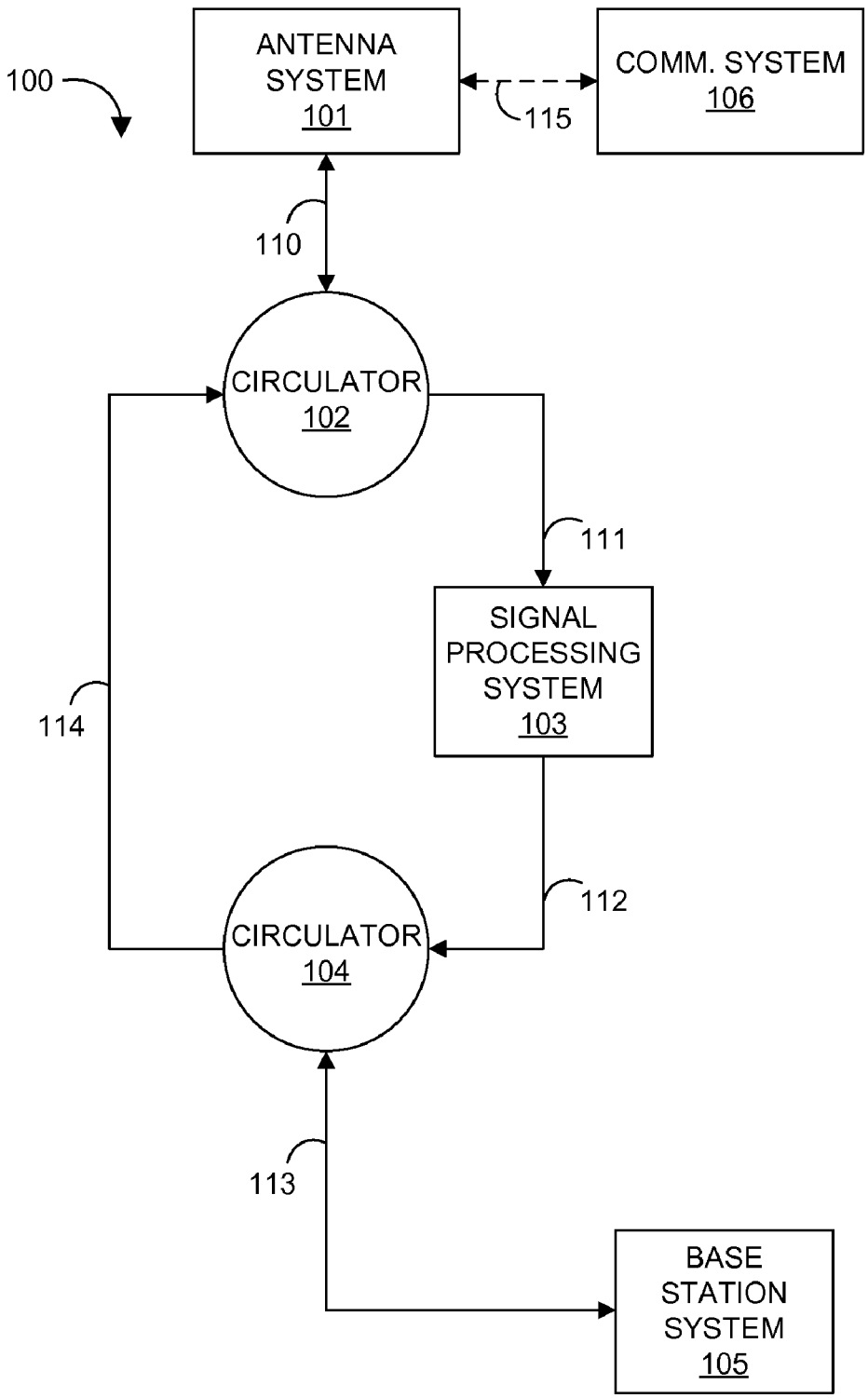
FIG. 1 is a block diagram illustrating a communication system.

FIG. 1 is a block diagram illustrating communication system 100. Communication system 100 is configured to filter and attenuate signals exchanged between antenna system 101 and base station system 105. Communication system 100 includes antenna system 101, circulator 102, signal processing system 103, circulator 104, and base station system 105.

Antenna system 101 and circulator 102 communicate over communication link 110. Circulator 102 and signal processing system 103 communicate over communication link 111. Signal processing system 103 and circulator 104 communicate over communication link 112. Circulator 104 and base station system 105 communicate over communication link 113. Circulator 104 and circulator 102 communicate over communication link 114. Thus, antenna system 101 and base station system 105 communicate over the links and components described above.

Antenna system 101 comprises an antenna and possibly other components, such as an amplifier, filter, signal processor, or other communication equipment. Antenna system 101 is a bi-directional antenna system that can receive signals from communication system 106 as well as transmit signals to communication system 106. Throughout the remainder of the descriptions of FIGS. 1 and 2, signals that antenna system 101 receives from communication system 106 will be referred to as receive signals and signals that antenna system 101 transmits to communication system 106 will be referred to as transmit signals. Antenna system 101 exchanges wireless receive and transmit signals with communication system 106 over communication link 115. Antenna system 101 exchanges receive and transmit signals with circulator 102 over communication link 110.

Circulator 102 comprises circuitry that receives, circulates, and transfers signals. For example, circulator 102 comprises three ports—ports 1, 2, and 3. A signal that enters circulator 102 via port 1 is circulated to port 2 and exits circulator 102 via port 2. Likewise, a signal that enters circulator 102 via port 2 is circulated to port 3 and exits via port 3 and a signal that enters circulator 102 via port 3 is circulated to port 1 and exits via port 1. To further illustrate, in FIG. 1 port 1 could be where communication link 110 and circulator 102 interface, port 2 could be where communication link 111 and circulator 102 interface, and port 3 could be where communication link 114 and circulator 102 interface.

Circulator 102 exchanges receive and transmit signals with antenna system 101 over communication link 110. Circulator 102 circulates and transfers a receive signal to signal processing system 103 over communication link 111. Circulator 102 receives a transmit signal from circulator 104 over communication link 114. Additionally, circulator 102 circulates and transfers the transmit signal to antenna system 101 over communication link 110.

Signal processing system 103 comprises components that filter and attenuate a signal. Signal processing system 103 receives a receive signal from circulator 102 over communication link 111. Signal processing system 103 also transfers a receive signal to circulator 104 over communication link 112.

Circulator 104 comprises circuitry that receives, circulates, and transfers signals. For example, circulator 104 comprises three ports—ports 1, 2, and 3. A signal that enters circulator 104 via port 1 is circulated to port 2 and exits circulator 104 via port 2. Likewise, a signal that enters circulator 104 via port 2 is circulated to port 3 and exits via port 3 and a signal that enters circulator 104 via port 3 is circulated to port 1 and exits via port 1. To further illustrate, in FIG. 1 port 1 could be where communication link 112 and circulator 104 interface, port 2 could be where communication link 113 and circulator 104 interface, and port 3 could be where communication link 114 and circulator 104 interface.

Base station system 105 comprises components that receive and transmit signals. Base station system 105 receives a receive signal from circulator 104 over communication link 113. Base station 105 also transfers a transmit signal to circulator 104 over communication link 113.

Communication links 110-114 comprise wired communication links. Communication links 110 and 113 comprise bi-directional links. Communication links 111, 112, and 114 comprise uni-directional links. Communication link 115 comprises a wireless communication link.

Figure 2:
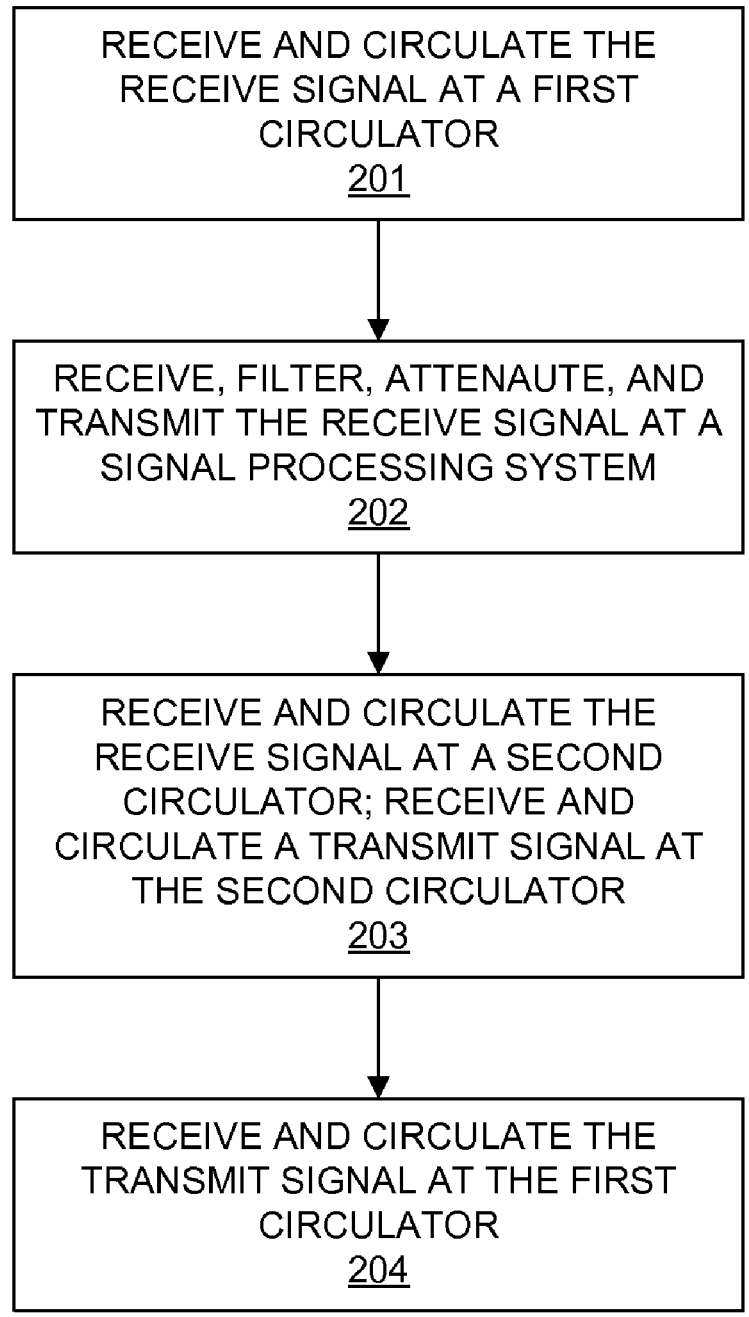
FIG. 2 is a flow diagram illustrating a method of operating a communication system.

FIG. 2 is a flow diagram illustrating a method of operating communication system 100 to filter and attenuate a signal in between antenna system 101 and base station system 105. Communication system 100 receives signals from communication system 106 and transmits signals originating from base station system 105 to communication system 106. In step 201, circulator 102 receives a receive signal from antenna system 101 over communication link 110. Circulator 102 then circulates and transfers the receive signal to signal processing system 103 over communication link 111.

In step 202, signal processing system 103 receives the receive signal from circulator 102 over communication link 111. After receiving the receive signal, signal processing system 103 filters the receive signal. For example, signal processing system 103 may contain a band-pass filter. Also after receiving the receive signal, signal processing system 103 attenuates the receive signal. Signal processing system 103 may filter and attenuate the receive signal in any order. Signal processing system 103 transfers the receive signal to circulator 104 over communication link 112.

In step 203, circulator 104 receives the receive signal from signal processing system 103 over communication link 112. Circulator 104 circulates and transfers the receive signal to base station system 105 over communication link 113. Also in step 203, circulator 104 receives a transmit signal transferred from base station system 105 over communication link 113. Circulator 104 circulates and transfers the transmit signal to circulator 102 over communication link 114. In step 204, circulator 102 receives the transmit signal from circulator 104 over communication link 114. Circulator 102 also circulates and transfers the transmit signal to antenna system 101 over communication link 110. Note, communication system 100 uses time-division duplex to separate receive and transmit signals.

Figure 3:
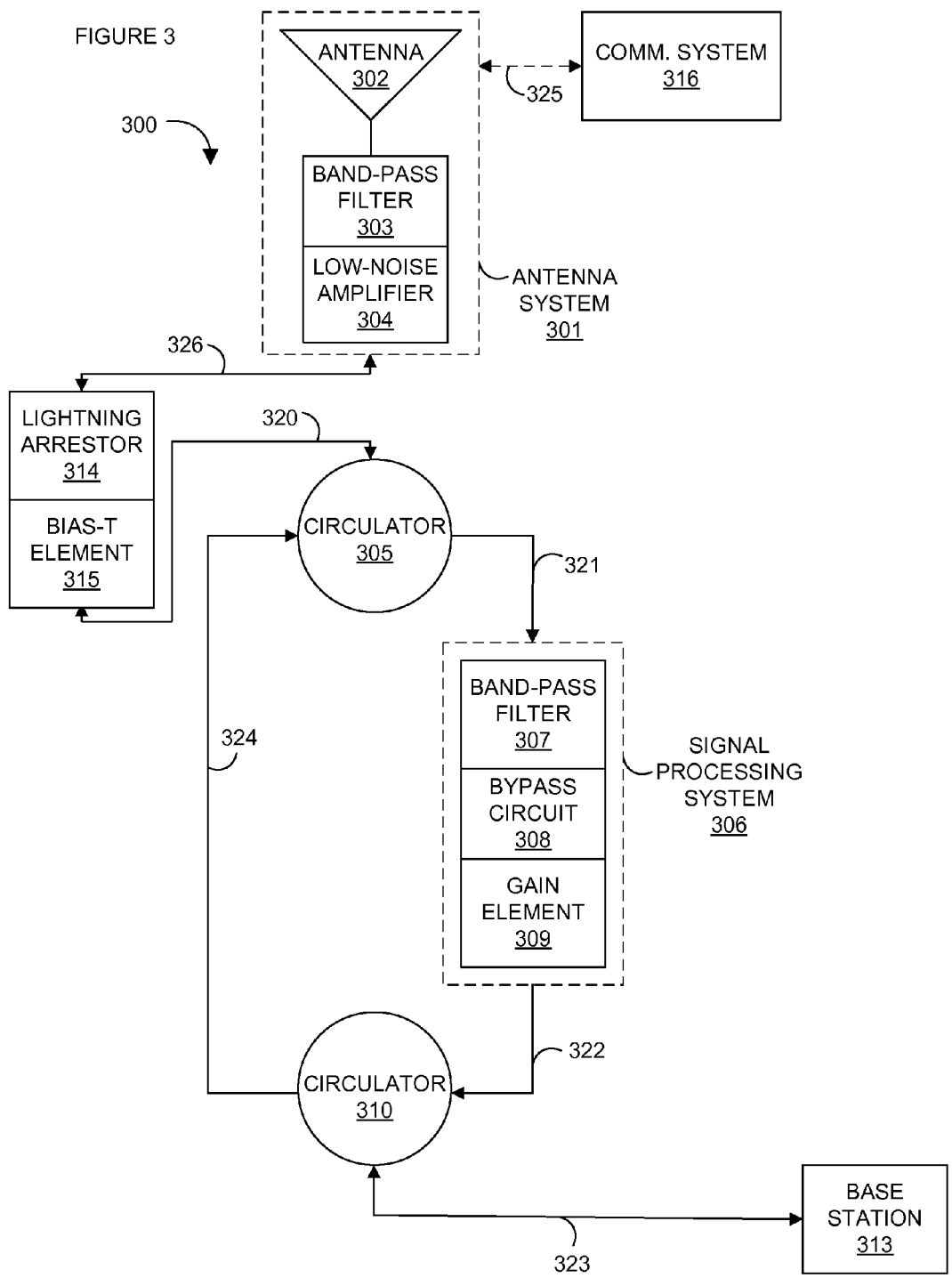
FIG. 3 is a block diagram illustrating a communication system.

FIG. 3 is a block diagram illustrating communication system 300.

Communication system 300 is configured to filter and attenuate signals in between antenna 302 and base station 313. Communication system 300 includes antenna system 301, circulator 305, signal processing system 306, circulator 310, base station 313, lightning arrestor 314, and bias-T element 315.

Antenna system 301 and lightning arrestor 314 communicates over communication link 326. Lightning arrestor 314 is electrically coupled to bias-T element 315. Bias-T element 315 communicates with circulator 305 over communication link 320. Circulator 305 and signal processing system 306 communicate over communication link 321. Signal processing system 306 and circulator 310 communicate over communication link 322. Circulator 310 and base station 313 communicate over communication link 323. Circulator 310 and circulator 305 communicate over communication link 324. Thus, antenna 302 and base station 313 communicate over the links and components described above.

Antenna system 301 comprises antenna 302, band-pass filter 303, and low-noise amplifier 304. Antenna 302, band-pass filter 303, and low-noise amplifier 304 are connected by electrical circuitry. Antenna 302 comprises a bar, dipole, patch, parabolic dish, array, or some other type of antenna. Band-pass filter 303 comprises circuitry that filters signals by allowing frequencies within a certain range to pass and rejecting frequencies outside of that range. Low-noise amplifier 304 comprises circuitry that amplifies signals. Throughout the remainder of the descriptions of FIGS. 3-7, signals that antenna system 301 receives from communication system 316 will be referred to as receive signals and signals that antenna system 301 transmits to communication system 316 will be referred to as transmit signals. Antenna system 301 receives receive signals from communication system 316 over communication link 325 as well as transmits transmit signals to communication system 316 over communication link 325. Additionally, antenna system 301 exchanges receive and transmit signals with lightning arrestor 314 over communication link 326.

Lightning arrestor 314 comprises circuitry that helps to prevent damage to electronic instruments within communication system 300 by limiting the rise in voltage when communication system 300 is struck by lightning. Lightning arrestor 314 is electrically coupled to bias-T element 315. Bias-T element 315 comprises circuitry that inserts power into communication link 326 as well as adds and removes signaling over communication link 326. Bias-T element 315 communicates with circulator 305 over communication link 320. Lightning arrestor 314 and bias-T element 315 are typically placed near base station 313 or integrated within base station 313.

Circulator 305 receives a receive signal from bias-T element 315 over communication link 320. Circulator 305 circulates and transfers the receive signal to signal processing system 306 over communication link 321. Additionally, circulator 305 receives a transmit signal from circulator 310 over communication link 324. Circulator 305 circulates and transfers the transmit signal to bias-T element 315 over communication link 320.

Signal processing system 306 comprises band-pass filter 307, bypass circuit 308, and gain element 309. Band-pass filter 307, bypass circuit 308, and gain element 309 are connected by electrical circuitry. Band-pass filter 307 comprises circuitry that filters signals by allowing frequencies within a certain range to pass and rejecting frequencies outside of that range. Bypass circuit 308 comprises circuitry that allows signals to bypass gain element 309, if needed. Gain element 309 comprises circuitry that inserts loss or adds gain to signals. Band-pass filter 307 filters a receive signal on the way to bypass circuit 308. If bypass circuit 308 receives a bypass signal, then bypass circuit 308 transfers the receive signal to circulator 310 over communication link 322. If bypass circuit 308 does not receive a bypass signal, then bypass circuit 308 transfers the receive signal to gain element 309. Gain element 309 inserts loss or adds gain to the receive signal before transferring the receive signal to circulator 310 over communication link 322.

Circulator 310 receives a receive signal from signal processing system 306 over communication link 322. Circulator 310 circulates and transfers the receive signal to base station 313 over communication link 323. Additionally, circulator 310 receives a transmit signal from base station 313 over communication link 323. Circulator 310 circulates and transfers the transmit signal to circulator 305 over communication link 324. Base station 313 receives the receive signal from circulator 310 over communication link 323. Base station 313 also transfers a transmit signal to circulator 310 over communication link 323. Although shown separately, circulator 305, signal processing system 306, and circulator 310 may be integrated within base station 313.

Communication links 320-324 and 326 comprise wired communication links. Communication links 320, 323, and 326 comprise bi-directional links. Communication links 321, 322, and 324 comprise uni-directional links. Communication link 325 comprises a wireless communication link.

Figure 4:
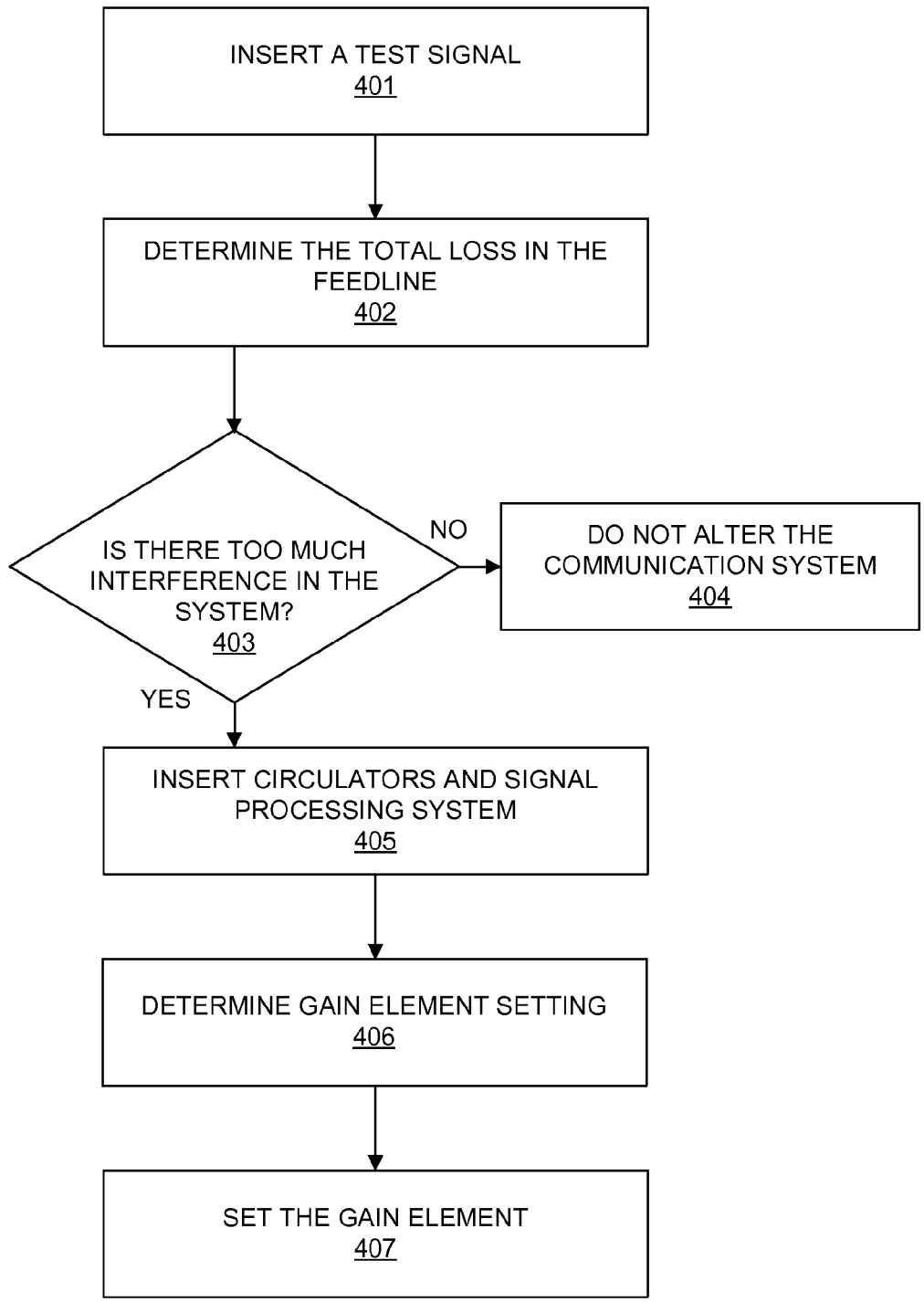
FIG. 4 is a flow diagram illustrating a method of configuring a communication system.

FIG. 4 is a flow diagram illustrating a method of configuring communication system 300. In step 401, a test signal is inserted into communication system 300 at a location between antenna 302 and band-pass filter 303. In step 402, the test signal is measured at a location on communication link 323 to determine the total loss present in communication system 300. For example, the total loss of communication system 300 could be −4 dB. Additionally, low-noise amplifier 304, which adds approximately 13 dB of gain to communication system 300, is bypassed during this measurement so as to not interfere with the determination of the total loss of communication system 300.

In step 403, a determination is made as to whether or not there is too much interference/noise in communication system 300. If a determination is made that there is not too much interference in communication system 300, then, in step 404, communication system 300 is not altered. However, if a determination is made that there is too much interference in communication system 300, then, in step 405, circulator 305, signal processing system 306, and circulator 310 are inserted in communication system 300 at a location between antenna system 301 and communication link 323. Signal processing system 306 will introduce a known quantity of additional loss into communication system 300. For example, signal processing system 306 will introduce −5 dB of loss into communication system 300.

In step 406, the amount of loss that gain element 309 needs to insert into communication system 300 to offset the gain inserted by low-noise amplifier 304, the total loss of the system, and the loss introduced by signal processing system 306 is determined. In step 407, gain element 309 is set so that the total loss in communication system 300 is equal to 0 dB. For example, if low-noise amplifier 304 inserted a gain of 13 dB, the total loss of the system was −4 dB, and signal processing system 306 inserted a loss of −5 dB, then gain element 309 would need to be set to insert −4 dB of loss into communication system 300 to create a net loss of 0 dB.

Another additional concern pertaining to communication system 300 is that low-noise amplifier 304 may stop functioning. In that case, the loss in communication system 300 will again become unbalanced. Using the example above to illustrate, when the 13 dB of gain from low-noise amplifier 304 is removed from communication system 300 the resulting total loss will now be −13 dB. In response, bypass circuit 308 may receive a signal to bypass gain element 309, which would remove the loss added by gain element 309 earlier. For example, the −4 dB of loss inserted into communication system 300 by gain element 309 would be removed thereby leaving only −9 dB of loss left in communication system 300.

Figure 5:
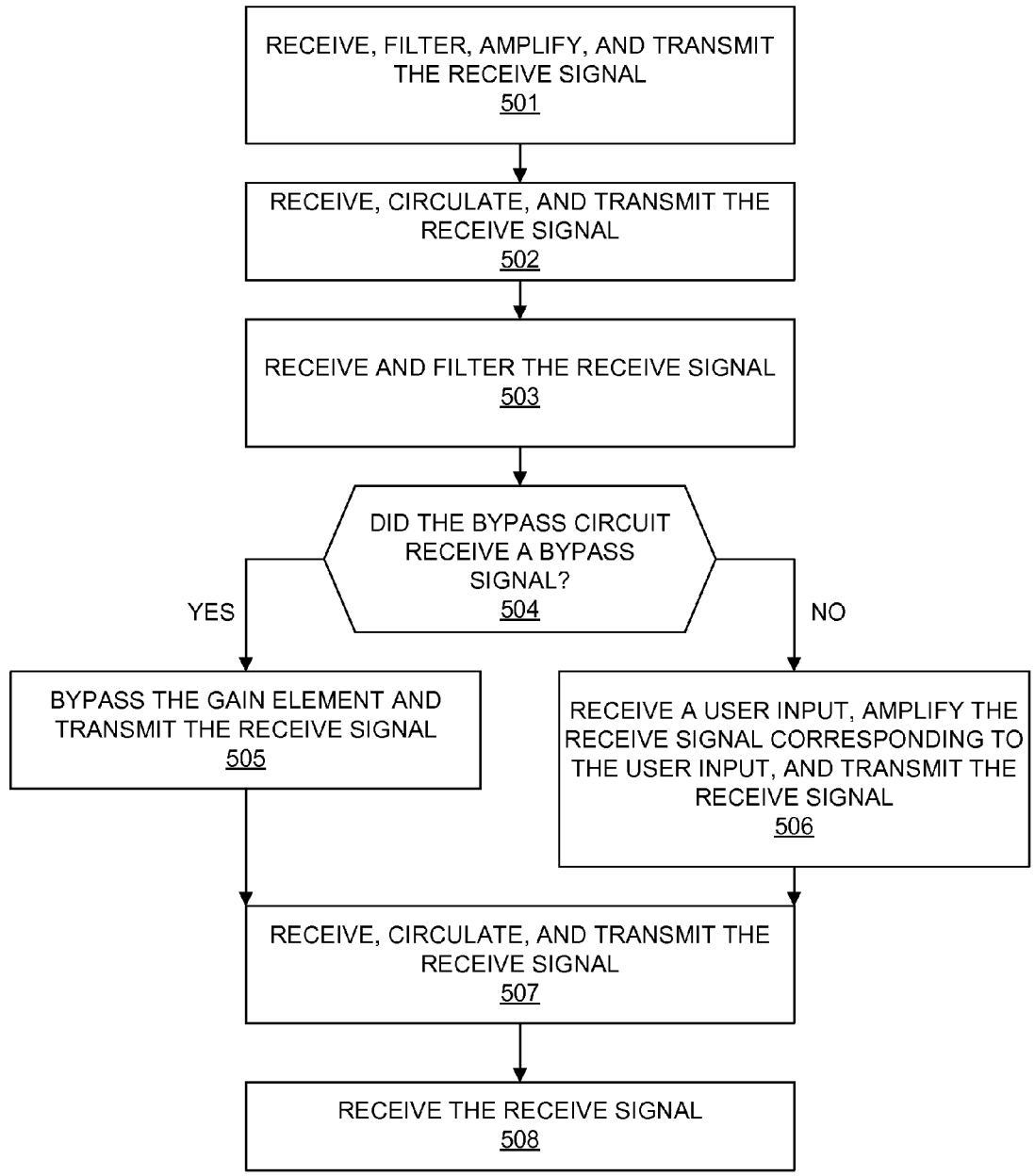
FIG. 5 is a flow diagram illustrating a method of operating a communication system.

FIG. 5 is a flow diagram illustrating a method of operating communication system 300 to filter and attenuate a receive signal transferred from antenna system 301 to base station 313. In step 501, antenna 302 receives a receive signal. Band-pass filter 303 filters the receive signal. Low-noise amplifier 304 amplifies the receive signal. Antenna system 301 transfers the receive signal to circulator 305 through lightning arrestor 314 and bias-T element 315 and over communication links 320 and 326.

In step 502, circulator 305 receives the receive signal from bias-T element 315 over communication link 326. Circulator 305 circulates and transfers the receive signal to signal processing system 306 over communication link 321. In step 503, signal processing system 306 receives the receive signal. Band-pass filter 307 filters the receive signal.

In step 504, bypass circuit 308 either receives a bypass signal or bypass circuit 308 does not receive a bypass signal. If bypass circuit 308 does receive a bypass signal, then, in step 505, the gain element is bypassed and the bypass circuit 308 transfers the receive signal to circulator 310 over communication link 322. If bypass circuit 308 does not receive a bypass signal, then, in step 506, gain element 309 receives the receive signal. Gain element 309 also receives a user input. Gain element 309 inserts loss into the receive signal based on the user input. Gain element 309 transfers the receive signal to circulator 310 over communication link 322.

In step 507, circulator 310 receives and circulates the receive signal. Circulator 310 transfers the receive signal to base station 313 over communication link 323. In step 508, base station 313 receives the receive signal from circulator 310 over communication link 323.

Figure 6:
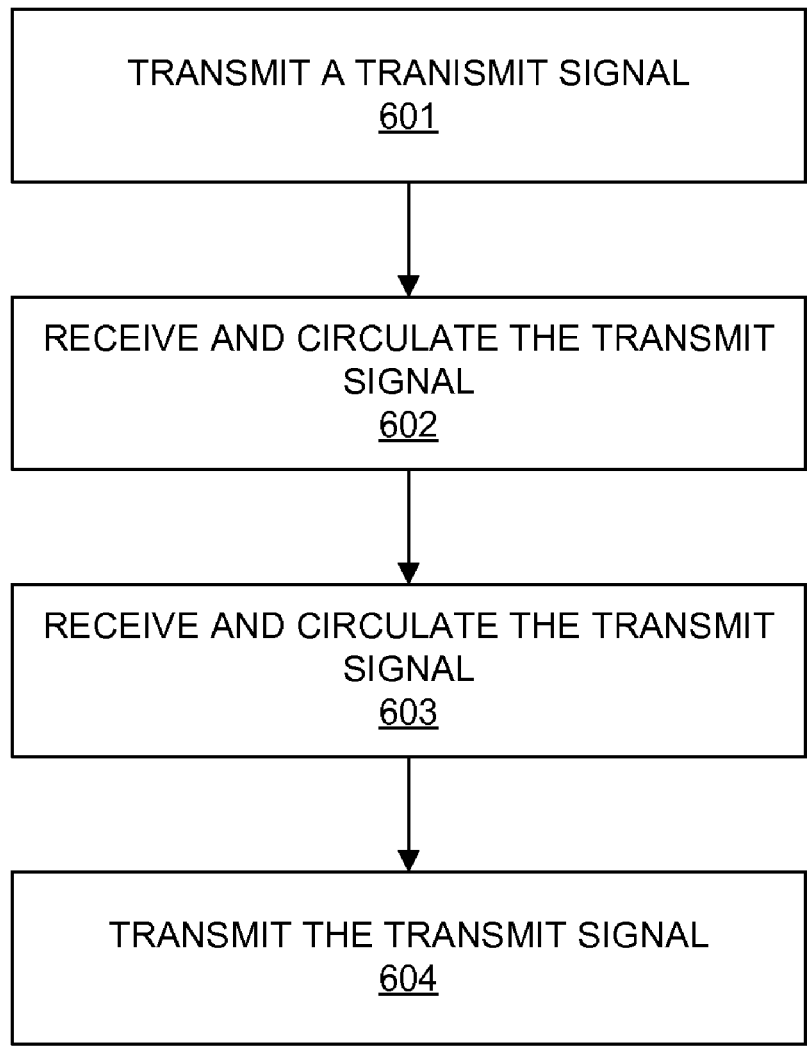
FIG. 6 is a flow diagram illustrating a method of operating a communication system.

FIG. 6 is a flow diagram illustrating a method of operating communication system 300 to transmit a transmit signal transferred from base station 313 to antenna system 301. In step 601, base station 313 transmits a transmit signal to circulator 310 over communication link 323. In step 602, circulator 310 receives the transmit signal from base station 313 over communication link 323. Circulator 310 circulates and transfers the transmit signal to circulator 305 over communication link 324.

In step 603, circulator 305 receives the transmit signal from circulator 310 over communication link 324. Circulator 305 circulates and transfers the transmit signal to antenna system 301 through lightning arrestor 314 and bias-T element 315 and over communication links 320 and 326. In step 604, antenna system 301 receives the transmit signal from circulator 305 over communication links 320 and 326. Low-noise amplifier 304 passes the transmit signal to band-pass filter 303. Antenna 302 transmits the transmit signal to communication system 316 over communication link 325.

Figure 7:
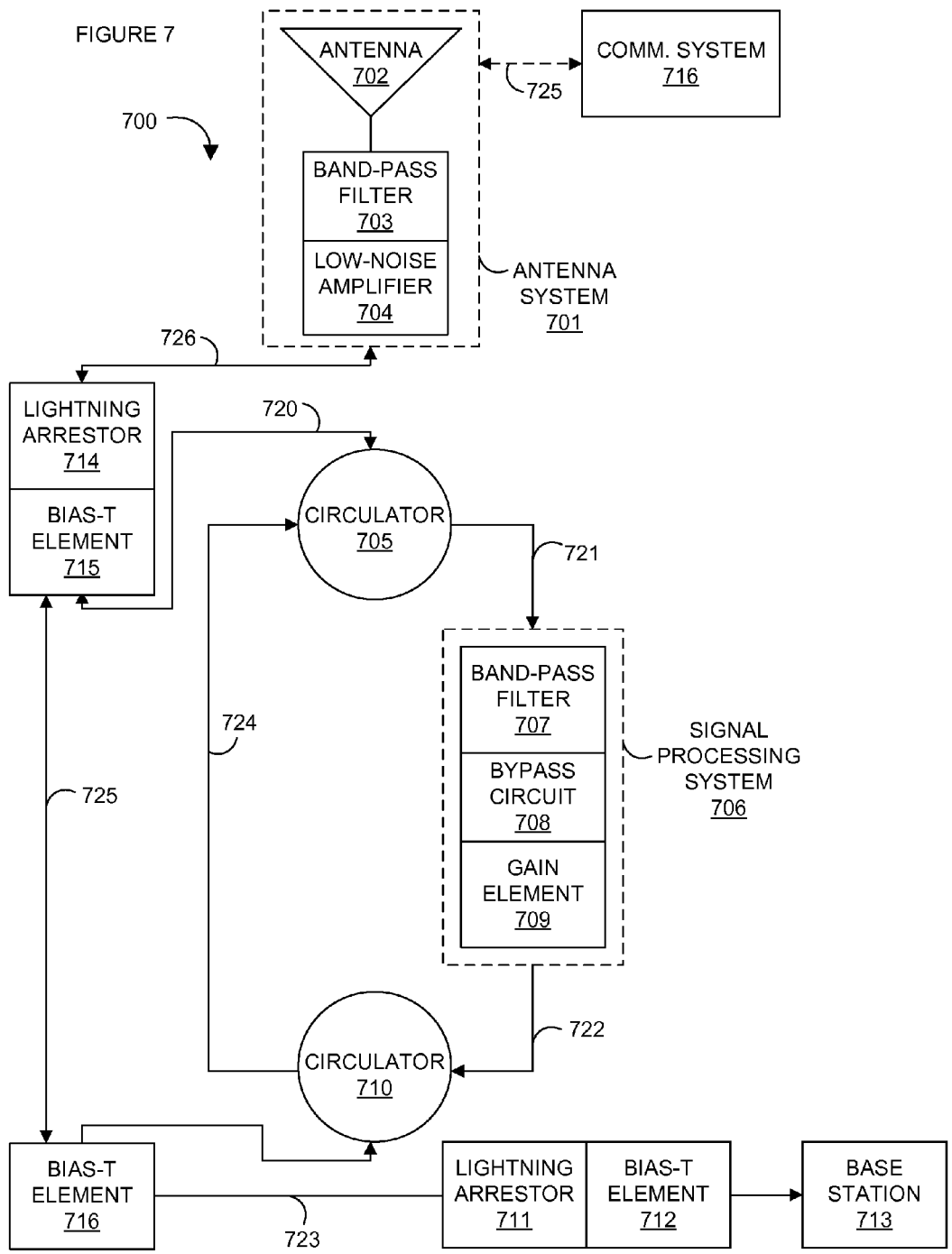
FIG. 7 is a block diagram illustrating a communication system.

FIG. 7 is a block diagram illustrating communication system 700. Communication system 700 is configured to filter and attenuate signals in between antenna 702 and base station 713. Communication system 700 includes antenna system 701, circulator 705, signal processing system 706, circulator 710, base station 713, lightning arrestor 714, bias-T element 715, and bias-T element 716. Communication system 700 is similar to communication system 300 except that in communication system 700 bias-T element 715 is further connected to bias-T element 716 by communication link 725. Additionally, communication link 723 (communication link 323 in communication system 300) also includes bias-T element 716, lightning arrestor 711, and bias-T element 712.

Bias-T element 712 adds DC voltage and signaling to the transmit signal sent from base station 713 to antenna 702. The DC voltage is used to power various components of antenna system 701, such as low-noise amplifier 704. Bias-T element 716 removes the DC voltage added to the transmit signal so that the added DC voltage does not pass through circulators 710 and 705 as well as signal processing system 706. Bias-T element 715 reinserts the DC voltage into the transmit signal once the transmit signal reaches communication link 720. Bias-T element 716 also adds and removes signaling over communication link 725. Bias-T element 716 may be located within the same component box as circulator 705, circulator 710, and signal processing system 706.

Note that signal processing systems 306 and 706 effectively provide a way to insert additional loss into a received signal without affecting a signal that is transmitted by communication systems 300 and 700 respectively. Moreover, signal processing systems 306 and 706 provide a way for an operator of communication systems 300 and 700 to determine the amount of loss to insert into the received signal. Signal processing systems 306 and 706 also allow the operator to remove any loss that had been previously inserted into the received signal.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A communication system for filtering and attenuating a receive signal in between a bi-directional antenna system and a bi-directional base station system, the communication system comprising:
    a first circulator configured to receive the receive signal from a first bi-directional link coupled to the bi-directional antenna system and circulate the receive signal to a first uni-directional link;
    a signal processing system configured to receive the receive signal from the first uni-directional link, filter and attenuate the receive signal, and transfer the receive signal to a second uni-directional link;
    a second circulator configured to receive the receive signal from the second uni-directional link, circulate the receive signal to a second bi-directional link coupled to the bi-directional base station system, receive a transmit signal from the second bi-directional link, and circulate the transmit signal to a third uni-directional link;
    the first circulator configured to receive the transmit signal from the third uni-directional link and circulate the transmit signal to the first bi-directional link coupled to the bi-directional antenna system.

2. The communication system of claim 1 wherein the signal processing system comprises a band-pass filter configured to filter the receive signal.

3. The communication system of claim 2 wherein the signal processing system comprises a gain element configured to attenuate the receive signal.

4. The communication system of claim 3 further comprising a bypass circuit configured to receive a bypass signal, and in response, to transfer the receive signal from the band-pass filter to the second uni-directional link to bypass the gain element.

5. The communication system of claim 4 wherein the gain element is configured to receive a user input and attenuate the receive signal at a gain level corresponding to the user input.

6. The communication system of claim 5 wherein the gain level balances gain and loss within the communication system.

7. The communication system of claim 1 further comprising the bi-directional antenna system configured to wirelessly receive the receive signal, transfer the receive signal to the first bi-directional link, receive the transmit signal from the first bi-directional link, and wirelessly transmit the transmit signal.

8. The communication system of claim 7 wherein the bi-directional antenna system comprises:
    a low-noise amplifier configured to amplify the receive signal and pass through the transmit signal; and
    a band-pass filter configured to filter the receive signal and the transmit signal.

9. The communication system of claim 1 further comprising the bi-directional base station system configured to receive the receive signal from the second bi-directional link and transfer the transmit signal to the second bi-directional link.

10. The communication system of claim 9 wherein the first and second bi-directional links comprise DC power and signaling bypass circuitry.

11. A method of operating a communication system to filter and attenuate a receive signal in between a bi-directional antenna system and a bi-directional base station system, the method comprising:
    receiving at a first circulator the receive signal from a first bi-directional link coupled to the bi-directional antenna system and circulating in the first circulator the receive signal to a first uni-directional link;
    receiving at a signal processing system the receive signal from the first uni-directional link, filtering and attenuating at the signal processing system the receive signal, and transferring from the signal processing system the receive signal to a second uni-directional link;
    receiving at a second circulator the receive signal from the second uni-directional link, circulating in the second circulator the receive signal to a second bi-directional link coupled to the bi-directional base station system, receiving at the second circulator a transmit signal from the second bi-directional link, and circulating in the second circulator the transmit signal to a third uni-directional link;
    receiving at the first circulator the transmit signal from the third uni-directional link and circulating in the first circulator the transmit signal to the first bi-directional link coupled to the bi-directional antenna system.

12. The method of claim 11 wherein the signal processing system comprises a band-pass filter and wherein filtering the receive signal comprises filtering the receive signal at the band-pass filter.

13. The method of claim 12 wherein the signal processing system comprises a gain element and wherein attenuating the receive signal comprises attenuating the receive signal at the gain element.

14. The method of claim 13 further comprising receiving at a bypass circuit a bypass signal, and in response, transferring from the band-pass filter the receive signal to the second uni-directional link to bypass the gain element.

15. The method of claim 14 further comprising receiving at the gain element a user input and wherein attenuating the receive signal at the gain element comprises attenuating the receive signal at a gain level corresponding to the user input.

16. The method of claim 15 wherein attenuating the receive signal at the gain element comprises attenuating the receive signal at a gain level corresponding to the user input, wherein the gain level balances gain and loss within the communication system.

17. The method of claim 11 further comprising wirelessly receiving at the bi-directional antenna system the receive signal, transferring from the bi-directional antenna system the receive signal to the first bi-directional link, receiving at the bi-directional antenna system the transmit signal from the first bi-directional link, and wirelessly transmitting from the bi-directional antenna system the transmit signal.

18. The method of claim 17 wherein the bi-directional antenna system comprises a low-noise amplifier and a band-pass filter, and further comprising amplifying at the low-noise amplifier the receive signal and passing through the transmit signal and filtering at the band-pass filter the receive signal and the transmit signal.

19. The method of claim 11 further comprising receiving at the bi-directional base station system the receive signal from the second bi-directional link and transferring from the bi-directional base station system the transmit signal to the second bi-directional link.

20. The method of claim 19 wherein the first and second bi-directional links comprise DC power and signaling bypass circuitry.

* * * * *